United States Patent Office 3,590,077
Patented June 29, 1971

3,590,077
SALTS OF CHRYSANTHEMIC ACID WITH 1-p-NITROPHENYL - 2-N,N - DIMETHYL-AMINO-PROPANE-1,3-DIOLS
Georges Muller, Nogent-sur-Marne, Gaston Amiard, Thorigny, Andre Poittevin, Les Lilas, and Vesperto Torelli, Maisons Alfort, France, assignors to Roussel-UCLAF, Paris, France
No Drawing. Continuation-in-part of application Ser. No. 610,219, Jan. 19, 1967. This application July 5, 1968, Ser. No. 742,485
Claims priority, application France, Jan. 26, 1966, 47,305; July 7, 1967, 113,580
The portion of the term of the patent subsequent to Mar. 9, 1987, has been disclaimed
Int. Cl. C07c 91/20
U.S. Cl. 260—501.17
4 Claims

ABSTRACT OF THE DISCLOSURE

Optical isomers of 1-p-nitrophenyl-2-N,N-dimethyl-amino-propane-1,3-diol and acid addition salts thereof, useful for the separation of racemic compounds and preparation thereof.

PRIOR APPLICATION

The present application is a continuation-in-part of our commonly assigned, copending U.S. patent application Ser. No. 610,219, filed Jan. 19, 1967 now U.S. Pat. No. 3,499,929.

PRIOR ART

The importance of the separation of racemic compounds such as racemic acids, which are formed in the synthesis of natural products of which only one isomer is active, is well known. The resolution of racemic acids is currently effected by combining the acid with an optically active base to form a mixture of two diastereoisomeric salts which can be separately recovered and purified and then decomposed into the corresponding dextrorotatory or levorotatory acid. Optically active bases such as brucine, morphine, quinine, L(+)-threo-1-p-nitrophenyl-2-amino-propane-1,3-diol, etc., have been used as resolution agents.

However, tests have shown that the resolution of an acid very often runs into great difficulties of a technical nature which cannot be predicted. The base should form easily crystallizable stable salts with one of the diastereoisomeric salts being distinctly less soluble than the other in order to facilitate the separation of the salts. Also, the base to be separated should preferably be slightly soluble in aqueous media so that it may be recovered without great difficulty after decomposition of its salt.

OBJECTS OF THE INVENTION

It is an object of the invention to provide novel, optically active isomers of 1-p-nitrophenyl-2-N,N-dimethylaminopropane-1,3-diol and its acid addition salts.

It is another object of the invention to provide a novel process for the preparation of the optically active isomers of 1-p-nitrophenyl-2-N,N-dimethylamino-propane-1,3-diol and its acid addition salts.

It is a further object of the invention to provide novel salts of the said optically active diol.

These and other objects and advantages of the invention will become obvious from the following detailed description.

THE INVENTION

The novel compounds of the invention consist of D(−)-threo-1-p-nitrophenyl - 2 - N,N - dimethylamino-propane-1,3-diol and L(+)-threo-1-p-nitrophenyl-2-N,N-dimethylamino-propane-1,3-diol and their acid addition salts. The said diastereoisomers are unexpectedly excellent agents for the resolution of racemic acids since they form salts of greater stability and better crystallizability and the bases are less soluble in aqueous media than known resolving agents such as ephedrine or L(+)-threo-1-p-nitrophenyl-2-amino-propane-1,3-diol.

The disastereoisomers of the invention are particularly useful for the resolution of racemic mixtures of 1,5-dioxo - 7a - lower alkyl-5,6,7,7a-tetrahydroindane-4-acetic acids which have been difficult to separate with known resolution agents due to the very slight solubility differences and poor stability of diastereoisomeric salts formed therewith, such as with L(+)-threo-1-p-nitrophenyl-2-amino-propane-1,3-diol. Other racemic acids may be resolved with the novel compounds of the invention and examples of said acids are polyhydronaphthalenic acids, tetrahydroindane acids and $\alpha$-amino acids.

1,5-dioxo - 7a - methyl - 5,6,7,7a - tetrahydroindane-4-acetic acid, which is described in French Pat. No. 1,384,854, is useful as an intermediate for the preparation of various steroids, such as B-nor-steroids and estradiol derivatives. To resolve a racemic mixture of the said acid, D(−)-threo-1-p-nitrophenyl-2-N,N-dimethyl-amino-propane-1,3-diol can be added to a solution of the racemic acid in an ethyl acetate-ethanol-water solvent to crystallize the dextrorotatory salt of D(−)-threo-1-p-nitrophenyl-2-N,N - dimethylamino-propane-1,3-diol with dextrorotatory 1,5-dioxo-7a-methyl-5,6,7,7a-tetrahydroindane-4-acetic acid, separating the said crystals from the mother liquor, treating the crystals with first alkaline conditions and then acid conditions to recover (+) 1,5-dioxo-7a-methyl-5,6,7,7a-tetrahydroindane - 4 - acetic acid having a melting point of 129° C. and a specific rotation of $[\alpha]_D^{20} = 225° \pm 1°$ (0.5% in water), evaporating the mother liquor taking up in water the residue, treating the aqueous solution with alkaline conditions, separating the crystals formed, acidifying the filtrate, then purifying the reaction mixture, extracting with an organic solvent, evaporating the extracts and treating the residue with L(+)-threo-1-p-nitrophenyl-2-N,N - dimethylamino-propane-1,3-diol to form the corresponding levorotatory salt which can be subjected to alkaline and then acid treatment to obtain (−)-1,5-dioxo-7a-methyl-5,6,7,7a-tetrahydroindane-4-acetic acid with a melting point of 129° C. and a specific rotation of $[\alpha]_D^{20} = -225° \pm 1°$ (0.5% in water). Of course, the order of addition of the optically active isomers of the invention may be reversed with the levorotatory salt being recovered first.

Another valuable use for the diastereoisomers of the invention is the resolution of dl-trans chrysanthemic acid into its optically active isomers. This process is characterized in the addition of D(−) or L(+) threo-1-p-nitrophenyl-2-N,N-dimethylaminopropane-1,3-diol to a solution of dl-trans chrysanthemic acid in an organic solvent to form the corresponding crystalline diastereoisomeric salt in a mother liquor, separating the crystalline salt and subjecting the latter to acid hydrolysis to get the optical isomer of trans chrysanthemic acid and recovering the other optical isomer of trans chrysanthemic acid from the mother liquor.

The organic solvent may be an aliphatic ether such as ethyl ether, isopropyl ether, etc.; an aromatic hydrocarbon such as benzene or toluene; an aliphatic alcohol such as methanol; an aliphatic acid ester such as ethyl acetate. Particularly preferred is isopropyl ether containing up to 15% of methanol. The acid hydrolysis is preferably effected with a strong mineral acid such as hydrochloric acid.

The process of the invention for the preparation of the threo-1-p-nitrophenyl-2-N,N-dimethylamino - propane-1,3- diols comprises subjecting a diastereoisomer of threo-1-p-nitrophenyl-2-amino-propane-1,3-diol to reductive alkylation with a mixture of formaldehyde and formic acid to form the corresponding N,N-dimethylamino compound, which can be converted into an acid addition salt with an organic or inorganic acid.

In the following examples, there are described several preferred embodiments to illustrate the invention. However, it should be understood that the invention is not intended to be limited to the specific embodiments.

EXAMPLE I

Preparation of D(—) and L(+)-threo-1-p-nitrophenyl-2-N,N-dimethylamino-propane-1,3-diols A reaction mixture of 50 gm. of D(—)-threo-1-p-nitrophenyl-2-amino-propane-1,3-diol, 50 cc. of 30% formol and 50 cc. of 98% formic acid was heated for about 3 hours in a steam bath after which it was distilled to dryness under vacuum. The oily residue obtained was dissolved in 150 cc. of water and after 40 cc. of 22° Bé ammonium hydroxide were added, the mixture was maintained for about 15 minutes at a temperature of about 80° C. Then 60 cc. of ammonium hydroxide were again added at a high temperature and the entire mixture was allowed to stand at a low temperature for about 1 hour. Thereafter, the crystals formed were vacuum filtered, washed with water and dried under exclusion of light, to obtain 53.5 gm. of D(—)-threo-1-p-nitrophenyl-2-N,N-dimethylamino-propane-1,3-diol. The product was then purified by dissolution in 2 N hydrochloric acid, followed by treatment with animal black and recrystallization by addition of N-sodium hydroxide. Thus by starting with 121.6 gm. of raw product, 113 gm. of pure product having a melting point of 101° C. and a specific rotation of $[\alpha]_D^{20} = -26° \pm 1°$ (c.=1% in ethanol), were obtained. The product was slightly soluble in water and soluble in dilute aqueous acids and alcohols.

Analysis.—Calculated for $C_{11}H_{16}O_4N_2$ (percent); molecular weight=240.25: C, 54.99; H, 6.71; N, 11.66. Found (percent): C, 55.2; H, 7.0; N, 11.5.

This compound is not described in the literature.

L(+)-threo-1-p-nitrophenyl - 2 - N,N-dimethylamino-propane-1,3-diol was prepared by starting with L(+)-threo-1-p-nitrophenyl-2-amino-propane-1,3-diol according to the above method and had a melting point of 101° C. and a specific rotation of $[\alpha]_D^{20} = +26° \pm 1°$ (c.=1% in ethanol). The product was slightly soluble in water and soluble in dilute aqueous acids and alcohols.

Analysis.—Calculated for $C_{11}H_{16}O_4N_2$ (percent); molecular weight=240.25: C, 54.99; H, 6.71; N, 11.66. Found (percent): C, 55.0; H, 6.7; N, 11.4.

This compound is not described in the literature. The starting compounds were prepared according to the process described by J. Controulis et al., J.A.C.S. 71, p. 2463 (1949).

EXAMPLE II

Resolution of 1,5-dioxo-7a-methyl-5,6,7,7a-tetrahydroindane-4-acetic acid

Step A—Preparation of the dextrorotatory salt of D(—)-threo-1-p-nitrophenyl-2-N,N-dimethylamino - propane-1,3-diol with dextrorotatory 1,5-dioxo - 7a - methyl-5,6,7,7a-tetrahydroindane-4-acetic acid: 22.2 gm. of racemic 1,5 - dioxo - 7a - methyl-5,6,7,7a-tetrahydroindane-4-acetic acid and 24 gm. of D(—)-threo-1-p-nitrophenyl-2-N,N-dimethylamino-propane-1,3-diol were dissolved at reflux in 100 cc. of ethyl acetate containing 2% of water and 7 cc. of ethanol. Crystallization was started and the solution was allowed to cool to room temperature over about 2 hours and then it was allowed to stand at a low temperature for 12 hours. The crystals formed were vacuum filtered, washed repeatedly with ethyl acetate containing 1% of water and finally dried to obtain 21.84 gm. of the desired salt having a melting point of about 100° C. and a specific rotation of $[\alpha]_D^{20} = +78° \pm 1°$ (c.=1% in water). The product was soluble in water and in alcohols and slightly soluble in ethyl acetate.

This compound is not described in the literature.

Step B—Preparation of dextrorotatory 1,5-dioxo-7a-methyl-5,6,7,7a-tetrahydroindane-4-acetic acid: 24 gm. of the dextrorotatory salt of D(—)-threo-1-p-nitrophenyl-2-N,N-dimethylamino-propane-1,3-diol with dextrorotatory 1,5-dioxo-7a-methyl-5,6,7,7a-tetrahydroindane - 4 - acetic acid were introduced into 100 cc. of ice water under an atmosphere of nitrogen. Then 50 cc. of N-sodium hydroxide were very slowly and under agitation added to the reaction mixture. The reaction mixture was then filtered and the filtrate was recovered, washed repeatedly with ethyl acetate, then acidified with concentrated hydrochloric acid. Ammonium sulfate was added until saturation was attained, and finally, the reaction mixture was extracted several times with methylene chloride. The extracts were combined, dried over magnesium sulfate, treated with animal black and evaporated to dryness under vacuum.

The residue was taken up in 20 cc. of toluene and allowed to stand for crystallization. The crystals formed were vacuum filtered, washed with iced toluene and dried to obtain 10.5 gm. of dextrorotatory 1,5-dioxo-7α-methyl-5,6,7,7α-tetrahydroindane-4-acetic acid having a melting point of 129° C. and a specific rotation of $[\alpha]_D^{20} = 225° \pm 1°$ (c.=0.5% in water). The product was slightly soluble in toluene, fairly soluble in water and soluble in alcohols and in chloroform.

Step C.—Preparation of the levorotatory salt of L(+) threo-1-p-nitrophenyl-2-N,N - dimethylaminopropane-1,3-diol with levorotatory 1,5-dioxo-7α-methyl-5,6,7,7α-tetrahydroindane-4-acetic acid: Using the procedure of Step A, the resolution of 61.5 gm. of racemic 1,5-dioxo-7α-methyl-5,6,7,7α-tetrahydroindane-4-acetic acid was effected with 68 gm. of D(—)-threo-1-p-nitrophenyl-2-N,N-dimethylamino-propane-1,3-diol to form the dextrorotatory salt of D(—)-threo-1-p-nitrophenyl - 2 - N,N-dimethylamino-propane-1,3-diol with dextrorotatory 1,5-dioxo-7α-methyl-5,6,7,7α-tetrahydroindane-4-acetic acid which precipitated. The mother liquors were recovered and evaporated to dryness under vacuum and the oily residue was taken up in water. The solution was made alkaline by the addition of aqueous sodium hydroxide and then was filtered to separate the crystals formed which were then washed several times with water. The filtrate and the wash waters were combined, washed with ethyl acetate and then acidified with hydrochloric acid. Ammonium sulfate was added until saturation was attained and after the residual racemic acid, which then precipitated was separated, the saturated solution of ammonium sulfate was repeatedly extracted with methylene chloride. The extracts were combined, dried over magnesium sulfate, treated with animal black, filtered and evaporated to dryness under vacuum. The residue was dissolved under reflux with 30 gm. of L(+)-threo-1-p-nitrophenyl - 2 - N,N-dimethylaminopropane-1,3-diol in 190 cc. of ethyl acetate containing 2% of water. Crystallization was started and the mixture was allowed to stand overnight. Then the crystals formed were vacuum filtered, washed with ethyl acetate containing 2% of water and dried. After their purification, 51.1 gm. of the desired salt having a specific rotation of $[\alpha]_D^{20} = -78° \pm 1°$ (c.=1% in water), were obtained. The product was slightly soluble in ethyl acetate and soluble in water and in alcohols.

This compound is not described in the literature.

Step D.—Preparation of levorotatory 1,5-dioxo-7α-methyl-5,6,7,7α-tetrahydroindane-4-acetic acid: The salt obtained in Step C was decomposed as was the dextrorotatory acid in Step B to obtain levorotatory 1,5-dioxo-7α-methyl-5,6,7,7α-tetrahydroindane-4-acetic acid having a melting point of 129° C. and a specific rotation of $[\alpha]_D^{20} = -225° \pm 1°$ (c.=0.5% in water). The product was slightly soluble in toluene, fairly soluble in water and soluble in alcohols and in chloroform.

EXAMPLE III 1.93 g. of D(—)-threo-1-p-nitrophenyl-2-N,N-dimethyl-aminopropane-1,3-diol and 1 g. of dl-trans chrysanthemic acid (prepared as in U.S. patent application Ser. No. 454,691, filed May 10, 1965) were added to 2 cc. of methanol and the mixture was heated to obtain complete dissolution. Upon cooling, crystallization occurred and it was let stand for some time at 0° C. and then the precipitate was vacuum filtered, impasted with isopropyl ether and dried to obtain 1.08 g. of slightly coloured crystals having a melting point of 90–100° C. (solvate).

This salt of D(—)-threo-1-p-nitrophenyl-2-N,N-dimethylaminopropane-1,3-diol and d-trans chrysanthemic acid was purified by recrystallization from a mixture of isopropyl ether-petroleum ether to obtain a product having a melting point of 118° C.–120° C. and a specific rotation $[\alpha]_D^{20} = -13° \pm 1$ (c.=1% in ethanol).

*Analysis.*—Calculated for $C_{21}H_{32}O_6N_2$ (percent): molecular weight 408.49: C, 61.74; H, 7.90; N, 6.86. Found (percent): C, 61.7; H, 7.9; N, 6.9.

1.50 g. of this salt of d-trans chrysanthemic acid and D(—)-threo-1-p-nitrophenyl-2-N,N-dimethylaminopropane-1,3-diol were treated with 20 cc. of 2 N hydrochloric acid and after stirring, the mixture was extracted twice with methylene chloride. The combined organic phases were washed with water until neutral and then dried. The solvent was evaporated off in vacuo to obtain 0.610 g. of d-trans chrysanthemic acid in the form of a slightly yellow oil which crystallized by standing at 0° C. and had a specific rotation $[\alpha]_D^{20} = +13° \pm 1$ (c.=1% in ethanol). Purification of this product produced a d-trans chrysanthemic acid having the physical constants, the melting point and specific rotation which are described in the literature for natural d-trans chrysanthemic acid.

By employing the same mode of operation, l-trans chrysanthemic acid was recovered from dl-trans chrysanthemic acid with L(+)-threo-1-p-nitrophenyl-2-N,N-dimethylaminopropane-1,3-diol.

EXAMPLE IV

Step A: 200 g. of crude dl-trans chrysanthemic acid were introduced into 800 cc. of isopropyl ether containing 15% of methanol and after 289 g. of D(—) threo 1 - p - nitrophenyl-2-N,N-dimethylaminopropane-1,3-diol were added thereto, the mixture was refluxed under stirring for 15 minutes. Then the solution was cooled —10° C. and stirring was continued for 2 hours at this temperature. The crystallized diastereoisomeric salt was vacuum filtered, washed with the solvent which had been used for the reaction and dried to obtain 214 g. (44% yield) of the salt of D(—) threo 1-p-nitrophenyl-2-N,N-dimethylaminopropane-1,3-diol and d-trans chrysanthemic acid having a specific rotation $[\alpha]_D^{20} = -13°$ (c.=1% in ethanol) and a base titer of 58.9% (the theory being 58.7%).

The mother liquor was preserved in the dark and in the following will be designated as liquor A.

Step B: 214 g. of the salt of Step A were introduced into 428 cc. of 2 N hydrochloric acid and the mixture was stirred for several minutes and the extracted with methylene chloride. The mother liquor of the extraction was preserved and in the following will be designated as liquor $B_1$. The extracts were washed with water and the wash water was preserved and in the following will be designated as liquor $B_2$. The extracts were then dried, treated with carbon black, filtered and evaporated to dryness in vacuo to obtain 88 g. (quantitative yield) of d-trans chrysanthemic acid, having a specific rotation $[\alpha]_D^{20} = +15°$ (c.=2% in ethanol) and an acid index of 333.3 and 333.4 (the theory: 333.0) and a melting point of 17° C.

By using the same mode of operation, l-trans chrysanthemic acid was recovered from dl-trans chrysanthemic acid with L(+) threo 1-p-nitrophenyl-2-N,N-dimethylaminopropane-1,3-diol.

Step C: Liquor $B_2$ was made alkaline by adding sodium hydroxide thereto until a pH value of 9 or more was obtained. The solution was then extracted with methylene chloride and the extracts were added to liquor $B_1$. The methylene chloride was distilled off in vacuo and with nitrogen bubbling therethrough at room temperature. The aqueous phase was made alkaline by addition of sodium hydroxide and then stirred for 1 hour at 0° C. The precipitated product was vacuum filtered, washed with water and dried to obtain 123 g. of D(—) threo 1-p-nitrophenyl-2-N,N-dimethylaminopropane-1,3-diol (that is 97.5%) identical with the starting reactant.

Step D: Liquor A was evaporated to dryness in vacuo and the residue was treated in the same way as the crystallized diastereoisomeric salt to obtain 112 g. of crude l-trans chrysanthemic acid.

Also by proceeding in the way of Step C the resolution base was recovered and 159 g. of the product were obtained (that is 97.5%).

Various modifications of the process and products of the invention may be made without departing from the spirit or scope thereof and it is to be understood that the invention is to be limited only as defined in the appended claims.

We claim:
1. The salt of d-trans chrysanthemic acid and L(+) threo 1-p-nitrophenyl-2-N,N-dimethylaminopropane-1,3-diol.
2. The salt of l-trans chrysanthemic acid and D(—) threo 1-p-nitrophenyl-2-N,N-dimethylaminopropane-1,3-diol.
3. The salt of l-trans chrysanthemic acid and L(+) threo 1-p-nitrophenyl-2-N,N-dimethylaminopropane-1,3-diol.
4. The salt of d-trans chrysanthemic acid and D(—) threo 1-p-nitrophenyl-2-N,N-dimethylaminopropane - 1,3-diol.

References Cited

UNITED STATES PATENTS

| | | | |
|---|---|---|---|
| 2,514,377 | 7/1950 | Crooks et al | 260—570.6 |
| 3,043,865 | 7/1962 | Nomine et al. | 260—501.17 |
| 3,478,101 | 11/1969 | Tsuruga et al. | 260—570.6 |

OTHER REFERENCES

Rodd: "Chemistry of Carbon Compounds," vol. II, Part A, p. 102, (1953).

ROBERT V. HINES, Primary Examiner

US. Cl. X.R.

260—514, 570.6